No. 762,016. PATENTED JUNE 7, 1904.
W. WYAND.
ROTARY ENGINE.
APPLICATION FILED OCT. 2, 1903.
NO MODEL.
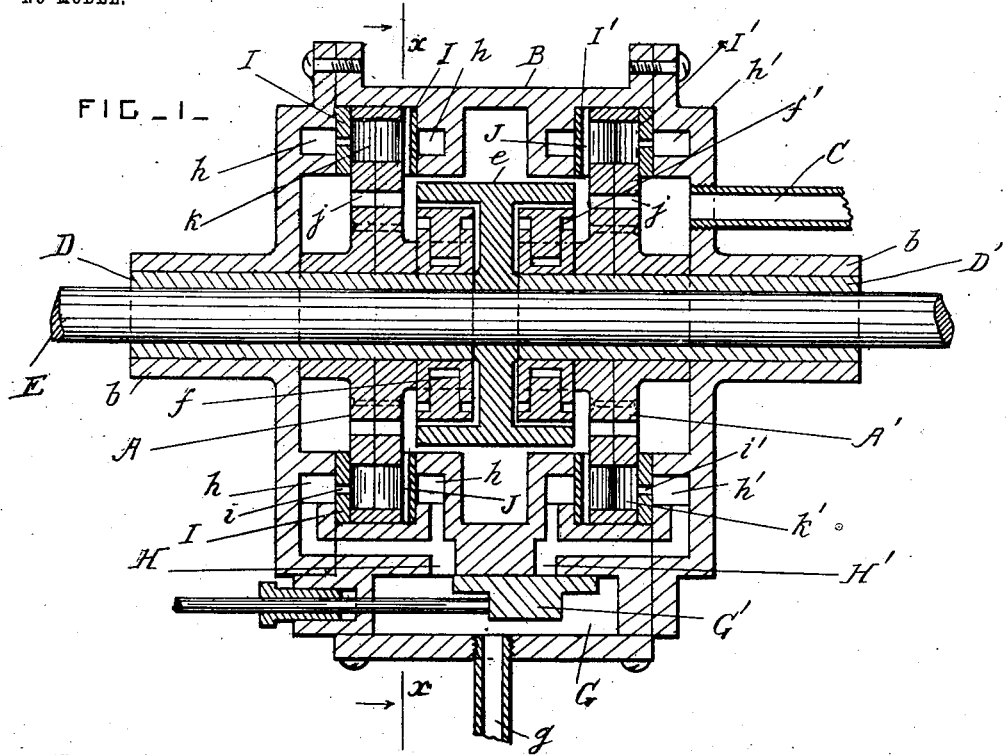
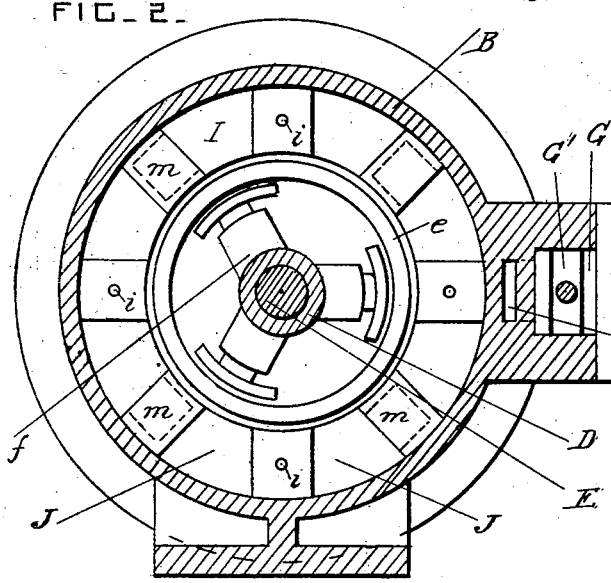
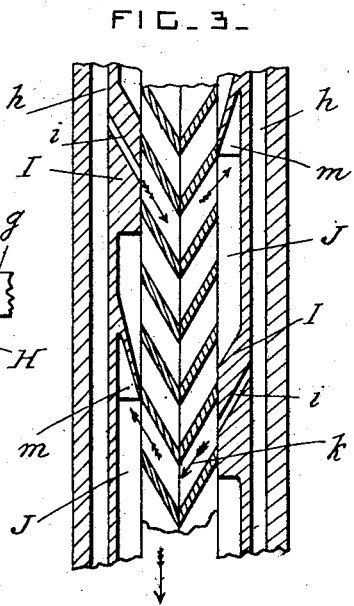
WITNESSES:
INVENTOR
William Wyand.
BY
Herbert W. J. Jenner.
Attorney No. 762,016. Patented June 7, 1904.

UNITED STATES PATENT OFFICE.

WILLIAM WYAND, OF COLLINGSWOOD, NEW JERSEY, ASSIGNOR TO WYAND-SOMERS-MOORE PATENT DEVELOPING COMPANY, OF COLLINGSWOOD, NEW JERSEY, A CORPORATION OF NEW JERSEY.

ROTARY ENGINE.

SPECIFICATION forming part of Letters Patent No. 762,016, dated June 7, 1904.

Application filed October 2, 1903. Serial No. 175,404. (No model.)

*To all whom it may concern:*

Be it known that I, WILLIAM WYAND, a citizen of the United States, residing at Collingswood, in the county of Camden and State of New Jersey, have invented certain new and useful Improvements in Rotary Engines; and I do hereby declare the following to be a full, clear, and exact description of the invention, such as will enable others skilled in the art to which it appertains to make and use the same.

This invention relates to rotary engines in which a disk or wheel is revolved by the impact of jets of steam; and it consists in the novel construction and combination of the parts hereinafter fully described and claimed.

In the drawings, Figure 1 is a horizontal longitudinal section through the engine. Fig. 2 is a cross-section taken on the line $x\ x$ in Fig. 1. Fig. 3 is a sectional diagram of a portion of the wheel with the adjacent jet-openings and abutments, said parts being shown for clearness as if flattened out and with the plates I relatively thicker.

A and A' are two similar wheels or disks which are arranged inside a common casing B side by side. The casing B is formed in sections, which are bolted together, and it has bearings $b$ and an exhaust pipe or opening C.

D and D' are two similar bushes which are journaled in the bearings $b$. The wheel A is secured on the bush D and the wheel A' is secured on the bush D'.

E is the driving-shaft of the engine, which is journaled in the bushes D and D', and $e$ is a double clutch member secured on the shaft E between the adjacent ends of the two said bushes.

The wheel A has a friction clutch member $f$ secured to it or to its bush, and the wheel A' has a similar friction clutch member $f'$. These clutch members are adapted to engage with the double clutch member automatically when the wheels to which they pertain are revolve at a prearranged speed.

The two wheels A and A' and their steam-passages are exactly alike, except that they are constructed to revolve in different directions. The clutches, by means of which the wheels are connected with the driving-shaft, are of any approved kind which can be used for that purpose, and the particular form of clutch members shown is shown for the purpose of illustration only, as any form of clutch member can be used; but clutches which are thrown into action automatically by centrifugal force are preferred.

The casing B is provided with a steam-chest G and a steam-supply pipe $g$ common to both wheels A and A'.

G' is a slide-valve for admitting steam to one or the other of the two wheels, according to the direction in which the driving-shaft is to be revolved. H and H' are the steam-passages, which are controlled by the said valve and which lead to the wheels A and A', respectively. The slide-valve is provided with any approved means for operating it, and any other approved form of distributing-valve may be used as its equivalent. The steam-passage H is divided into two branches, which communicate with two annular spaces $h$ for steam in the casing B upon opposite sides of the wheel A and near its periphery.

I represents facing-rings for the wheel A to run between. These facing-rings have inclined steam-jet holes $i$ and abutments $m$ arranged in a series around them, the abutments of one ring being opposite the jet-holes of the other ring.

J represents spaces in the rings between the abutments and the jets which communicate with the exhaust-chamber of the casing, and the wheels are provided with openings $j$, so that all the exhaust-spaces may be in communication with each other and with the exhaust-pipe.

The abutments on the rings I are preferably constructed in the form of wedge-shaped pockets. The wheel A has a series of V-shaped chambers $k$ extending around it near its periphery. These chambers are open to the steam-jet holes on one side and to the abutments on the other side of the wheel. The other wheel, A', is provided with similar V-shaped pockets or chambers $k'$, which are like the chambers $k$ of the wheel A, except that they are arranged to point in the reverse direction. The casing has facing-rings I' on each side of the wheel A', and these rings have steam-jet holes i' and abutments similar to the corresponding parts previously described, but arranged in the reverse direction. When steam is admitted to the wheel A, as shown in the drawings, it passes through the jet-holes into the V-shaped chambers of the wheel. It impinges against the bottoms of these chambers and then rebounds and passes out at the other side of the wheel and impinges against the abutments. The steam then passes to the exhaust-spaces and out by the exhaust-pipe. The exhaust-steam spaces at the sides of the wheel enable the wheel to run very freely and with very little friction. When the wheel A has attained a prearranged speed, its clutch member engages automatically with the double clutch member on the driving-shaft, so that the said shaft is revolved. When the valve is reversed, so that steam is admitted to the wheel A', the shaft is revolved in the opposite direction in a similar manner. In this way a reversible engine is provided which is very convenient for use in a great many situations and for a great many purposes.

What I claim is—

1. In a rotary engine, the combination, with a casing provided with a steam inlet and exhaust, and a driving-shaft journaled in the casing; of two wheels provided with a series of V-shaped chambers for the steam and journaled concentric with the said shaft inside the said casing, a double clutch member secured on the said shaft between the two said wheels, clutch members secured to the respective wheels and in operative connection with the said double clutch member, and a distributing-valve provided with ports for admitting steam to the one or the other of the said wheels.

2. In a rotary engine, the combination, with a casing provided with a steam inlet and exhaust and having bearings at its opposite sides, of bushes journaled in the said bearings, a shaft journaled in the said bushes, a double clutch member secured on the said shaft between the adjacent ends of the said bushes, two wheels provided with a series of V-shaped chambers for the steam and secured on the said bushes, clutch members secured to the respective wheels in operative connection with the said double clutch member, and a distributing-valve provided with ports for admitting steam to one or the other of the said wheels.

3. In a rotary engine, the combination, with a casing provided with annular steam-passages, and facing-plates provided with inclined steam-jet holes and abutments, the jet-holes of one plate being opposite the abutments of the other plate; of a wheel journaled in the casing and provided with a series of V-shaped chambers which are open at opposite sides of the wheel and which run between the said facing-plates.

4. In a rotary engine, the combination, with a casing provided with annular steam-passages, and facing-plates provided with inclined steam-jet holes, abutments between the jet-holes, and exhaust-spaces between the said jet-holes and abutments, the jet-holes of one said plate being opposite the abutments of the other said plate; of a wheel journaled in the casing and provided with a series of V-shaped chambers which are open at opposite sides of the wheel and which run between the said facing-plates.

5. In a rotary engine, the combination, with a casing provided with annular steam-passages, and an exhaust-cavity; of a wheel arranged in the said casing between the said passages, a driving-shaft journaled in the casing, automatic clutch mechanism arranged in the said exhaust-cavity between the said wheel and shaft, and facing-plates provided with steam-jet holes and abutments and arranged between the said steam-passages and the said wheel, said wheel being provided with a series of V-shaped steam-chambers.

6. In a rotary engine, the combination, with a casing provided with annular steam-passages, and facing-plates provided with steam-jet holes and wedge-shaped pockets which form abutments, the jet-holes of one plate being opposite the wedge-shaped pockets of the other plate; of a wheel journaled in the casing and provided with a series of V-shaped chambers which are open at opposite sides of the wheel and which run between the said facing-plates.

In testimony whereof I affix my signature in presence of two witnesses.

WILLIAM WYAND.

Witnesses:
T. G. COULTER,
P. T. SHINN.